C. H. WOLFE.
VEHICLE LAMP MOUNTING.
APPLICATION FILED FEB. 12, 1920.
1,376,988.
Patented May 3, 1921.
2 SHEETS—SHEET 2.
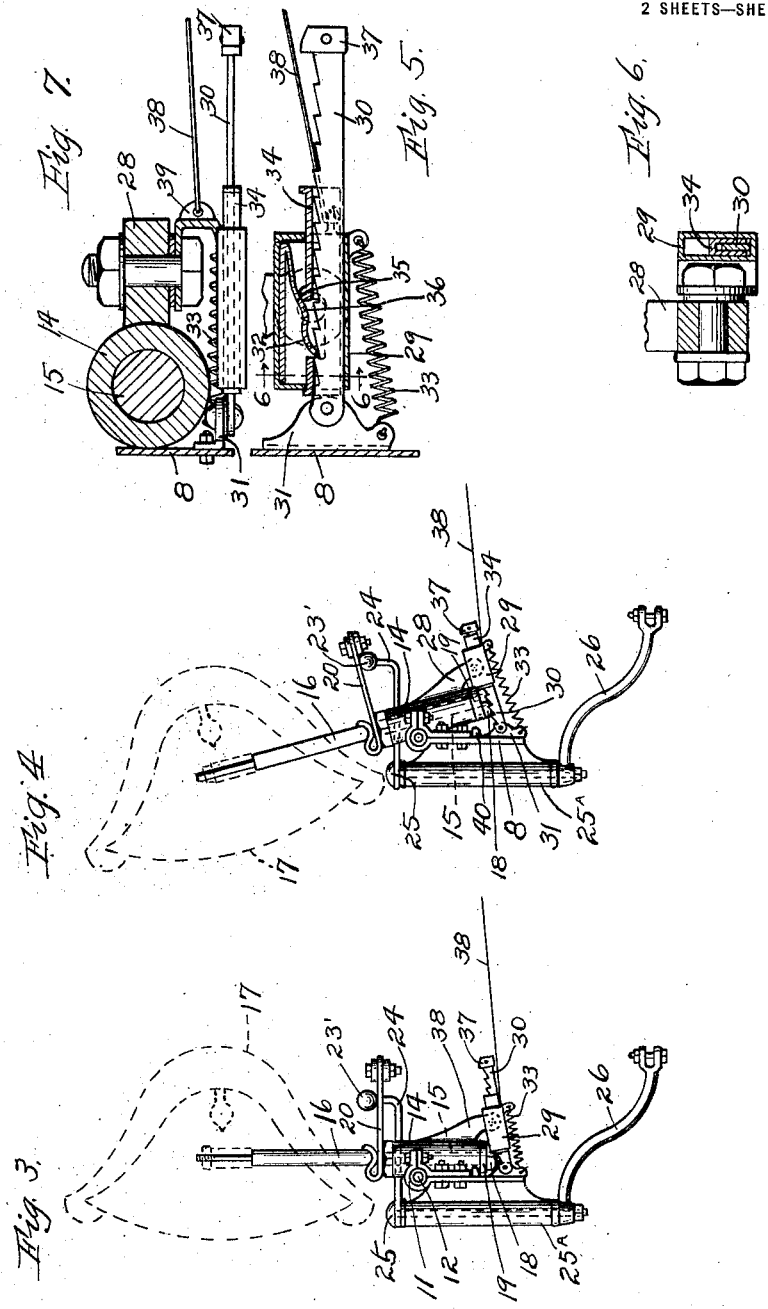
Inventor:
Charles H. Wolfe
By Brown & Nissen
Attys.

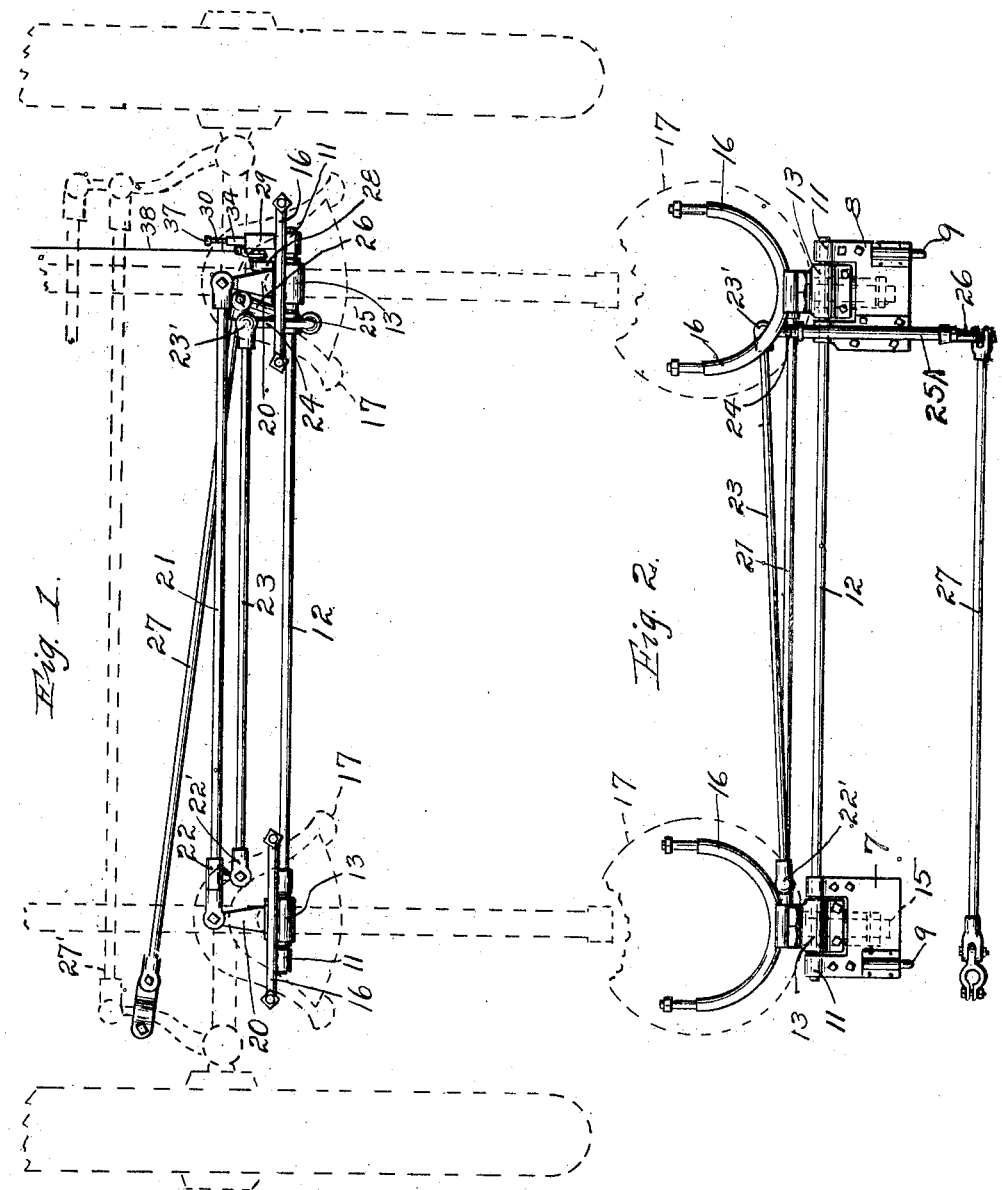

UNITED STATES PATENT OFFICE.

CHARLES H. WOLFE, OF PORT CLINTON, OHIO.

VEHICLE-LAMP MOUNTING.

1,376,988. Specification of Letters Patent. Patented May 3, 1921.

Application filed February 12, 1920. Serial No. 358,032.

*To all whom it may concern:*

Be it known that I, CHARLES H. WOLFE, a citizen of the United States, residing at Port Clinton, in the county of Ottawa and State of Ohio, have invented certain new and useful Improvements in Vehicle-Lamp Mountings, of which the following is a specification.

My invention relates to vehicle lamp mountings, and one of its objects is the provision of simple and efficient means for mounting vehicle lamps in a manner to be moved on vertical axes in accordance with the direction of travel of the vehicle, and also for movement on a horizontal axis for tilting the lights of the vehicle to throw a light closer to or farther ahead of the vehicle.

A further object is the provision of means for supporting vehicle lights in a manner to tilt the lights by manual or pedal control and locking the lights in different positions of their tilting movements.

Other objects will appear hereinafter.

An embodiment of my invention is illustrated in the accompanying drawings, forming a part of this specification, and in which—

Figure 1 is a plan view of a lamp mounting embodying my invention;

Fig. 2 is a front view of the same;

Fig. 3 is an enlarged end view;

Fig. 4 is a view similar to Fig. 3, but showing the parts in position for holding the lamps in tilted positions;

Fig. 5 is an enlarged section showing details of a locking mechanism used in the construction;

Fig. 6 is a view taken on line 6—6 of Fig. 5; and

Fig. 7 is a sectional plan view, showing details of a locking mechanism used in the construction.

In the drawings I have illustrated supporting members 7 and 8 each having a depending part 9 adapted to fit in the lamp sockets of conventional construction of an automobile, or the like. It will be understood, however, that the parts 9 may be of any particular design so as to secure supporting members to any automobile or other vehicle in any desirable manner.

Near the upper end of members 7 and 8 are bearings 11 in which is journaled a substantially horizontal shaft 12. Near the ends of the shaft 12 are members 13 which may be secured to the shaft 12 by being clamped thereon as clearly indicated, or in any other desirable manner. Each of the members 13 is provided with a bearing 14 adapted to receive a vertical shaft 15. At the top of each vertical shaft 15 is a yoke 16 of a lamp bracket which is designed to receive a lamp 17 of any preferred design. The device illustrated is such as generally used in automobiles, but it will be understood that the shapes and sizes of the parts may be varied to accommodate lamps of any other kinds of vehicles. The lower end of each shaft 15 is provided with a nut 18 threaded thereon and some form of friction-reducing means 19. This friction-reducing means may be any of the devices for reducing friction now in use, such as fiber washers, ball bearings, and the like.

On the upper end of each shaft 15, adjacent the yoke 16, is an arm 20 extending rearwardly which is rigidly connected under yoke 16 by means of a nut as shown. The two arms 20 are connected together by a connecting link 21 which may be adjustable so as to permit adjustment to any width required to fit the vehicle and keep the lamps parallel to each other. This connecting link may be made adjustable by a threaded connection 22 as indicated, or in any other desirable manner. At one end of the connecting link 21 close to where it connects with arm 20 is provided a ball joint connection 22' for connecting the link 23 to the link 21. The other end of the link 23 is connected with the arm 24 by a similar ball joint 23'. The arm 24 is attached to the upper end of shaft 25 which fits in the housing 25^A. The lower end of shaft 25 is provided with an arm 26 which is adapted to be connected to a connecting link 27, and the latter is connected with the steering gear 27' of the automobile or other vehicle, as shown diagrammatically in Fig. 1. The connecting link 27 may be so adjusted at its connection with the steering gear that the lamps 17 will turn to effect the directing of the light around a corner, or in either direction laterally to a greater or lesser degree, or to the same degree as the movement of the front or steering wheels. The arrangement is such that when the steering gear of the automobile moves the connecting link 27, the connecting parts including the arm 26, shaft 25, arm 24 and connecting link 23 will cause the lamps 17 to direct their lights in the direction in which the vehicle is traveling.

The connecting link 23 is so arranged that when shaft 12 is oscillated the lamp brackets will not be oscillated in their vertical bearings to any appreciable extent. By reason of the long connecting link 27 and the yoke formed by the arm 26, the shaft 25 and the arm 24, the vibration between the steering gear on the front axle and the body of the automobile or other vehicle is not transmitted to the dirigible head light mechanism.

The vertical bearings 14 are each provided with an arm 28, one of which may be pivotally connected at its lower end to a housing 29, and a rack bar 30 extends through the housing 29, as clearly indicated in Fig. 5. One end of the rack bar 30 is pivoted to a bracket 31 on support 8. In the housing 29 is a pawl 32. In the present form the pawl 32 is indicated as being a spring member, but it will be understood that any other desirable form may be used. The pawl 32 is adapted to engage the teeth of the rack bar 30 in a manner to prevent movement of the arm 28 toward the support 8. A spring 33 is connected to a part of the bracket 31 and to the housing 29 so as to tend to pull the arm 28 toward the support 8. The pawl 32 will, of course, prevent the arm 28 from moving toward the support 8, except when the parts are properly manipulated.

In order to move the arm 28 toward the support 8, I provide a member 34 which is longer than the housing 29 and extends through the latter. The member 34 has a part 35 adapted to move under a hump 36 in the pawl 32 to press the latter out of engagement with the teeth of rack 30. One end of the rack 30 is provided with a head 37 adapted to engage one end of member 34 when the housing is drawn out on the rack 30 a sufficient distance. When the housing is thus drawn out, the arm 28 rocks the lamps 17 on the axis of the shaft 12, as indicated in Fig. 4. When the member 29 is drawn out a sufficient distance on the rack 30, one end of the member 34 will engage the head 37 and move the part 35 under the hump 36 and disengage the pawl 32 from the rack bar 30. The spring 33 connected between the bracket 31 and the housing 29, will then move the arm 28 and the housing 29 back toward bracket 31 and upon engaging said bracket 31, the member 34 will be moved to substantially the position indicated in Fig. 5 and move the part 35 out from under hump 36 permitting pawl 32 to again engage the rack bar 30.

A cable, cord or lever rod connection 38 may be attached to an ear 39 on the housing 29 and extend to a suitable position convenient to the operator for moving arm 28 to tilt the lamps forward and thus divert the focused rays of light as desired. Any form of foot or hand-operated lever may be provided for operating the cable, cord or lever rod connection 38.

On member 8 in Fig. 4, I have indicated a limit stop or bumper adjustment 40 which is adapted to limit the movement of bearings 14 in one direction and hold the lamps in upright position. The tilting movement of said lamps may be limited by head 37, and the head 37 may be adjusted along on rack bar 30 when so desired.

In the operation of the dirigible head-light mechanism shown in the drawings, movement of the steering gear mechanism 27' to one side or the other will transmit corresponding movements to the link 27 shown in Fig. 1, and the levers 24 and 26 will be moved on the upright axis of the shaft 25 to transmit movement to the rod 23 and thence to the link 21 to move the lamps in parallelism on their respective upright axes of the vertical shafts 15. It should be understood that the lamps can thus be moved laterally independently of the mechanism for tilting the lamps on the horizontal axis of the shaft 12. Furthermore, the lamps may be tilted on the horizontal axis independently of their laterally directed positions because the upright bearings 14 are pivotally mounted on the axis of the shaft 12 for tilting movements as determined by the pulling of the rope 38. The latter may be pulled until the lamps are tilted to the extent desired, and are held in such adjusted position by the teeth on the rack bar 30. When the lamps are to be brought back to their upright positions, the rope 38 may be pulled so as to first tilt the lamps to their maximum positions as determined by the abutment 37 whereupon the pawl 32 will be released. Then, when the pull on the rope 38 is released, the spring 33 will automatically return the lamps to their upright positions, whereupon the slidable U-shaped device 34 will strike the bracket 31 and automatically replace the pawl 32 by letting it project through the slot in the device 34 into engagement with the rack teeth, as shown in Fig. 5.

Obviously those skilled in the art may make various changes in the details and arrangement of parts without departing from the spirit and scope of my invention as defined by the claims hereto appended, and I desire, therefore, not to be restricted to the precise construction herein disclosed.

I claim:

1. A vehicle lamp support mounted for oscillation on an axis; an arm extending from said support; a housing connected with said arm; a rack bar extending through the housing; and a pawl loosely mounted in the housing with the walls of the latter holding said pawl in operative condition.

2. A vehicle lamp support mounted for oscillation on an axis; an arm extending from said support; a housing connected with the arm; a rack bar extending through the housing; a pawl in the housing engaging the rack bar; stops at the ends of the rack bar; and a setting member extending through the housing with its ends adapted to engage said stops to alternately engage and disengage the pawl and rack bar.

3. A vehicle lamp support mounted for oscillation on an axis; an arm attached to said support; a housing pivoted to the arm; a rack bar extending through the housing; a pawl in the housing engaging the rack bar; stops at the ends of the rack bar; a hump on the pawl; and a setting member adapted to engage said stops for moving the setting member alternately in and out of engagement with said hump to disengage and engage the pawl and rack bar.

4. A vehicle lamp support mounted for oscillation on a horizontal axis; an arm extending from said support; a rack bar; a pawl associated with said arm and engaging the rack bar; a spring connected to said arm tending to move the latter in a predetermined direction; a shoulder at one end of the rack bar; and means adapted to engage the shoulder and disengage the pawl from the rack bar.

5. A vehicle lamp mounting comprising a lamp bracket mounted for oscillation on a horizontal axis; an arm attached to the lamp bracket; a rack bar; a pawl associated with the arm and engaging the rack bar for holding the arm and lamp bracket in adjusted positions; a spring tending to move the arm and lamp bracket in one direction; stops at the ends of the rack bar; and a member adapted to engage one of said stops and disengage the pawl from the rack bar and engage the other stop to reëngage the pawl with the rack bar.

6. A vehicle lamp mounting comprising a lamp bracket mounted for oscillation on a horizontal axis; an arm operatively connected with the lamp bracket; a housing connected with the arm; a spring connected with the housing and exerting force on the arm in one direction; a rack bar extending through the housing; and a resilient pawl mounted within the housing engaging the rack bar and locking the arm against the influence of said spring.

7. A vehicle lamp mounting comprising a lamp bracket mounted for oscillation on a horizontal axis; an arm operatively connected with the lamp bracket; a housing connected with the arm; a spring connected with the housing and exerting force on the arm in one direction; a rack bar extending through the housing; a pawl in the housing engaging the rack bar and locking the arm against the influence of said spring; and means for automatically disengaging the pawl from the rack bar.

8. A vehicle lamp mounting comprising a support mounted for oscillation on a horizontal axis; a lamp bracket on said support; an arm attached to said support; a rack bar; a housing slidably mounted on the rack bar and connected with said arm; a pawl in the housing normally engaging the rack bar; a member mounted on the rack bar and extending through the housing; means at one end of the rack bar adapted to be engaged by said member for moving the latter into engagement with the pawl for disengaging the latter from the rack bar; and means at the other end of the rack bar for restoring said pawl into engagement with said rack bar.

9. A vehicle lamp mounting comprising means for supporting a lamp for oscillation relatively to the vehicle on an upright axis, a link connected to said means and extending to the other side of the vehicle, a yoke pivotally mounted for oscillation on an upright axis and pivotally connected at one end to said link, and an additional link pivotally connected to the other end of said yoke and extending back to the other side of the vehicle for connection to steering mechanism.

10. A vehicle lamp mounting comprising means for supporting two spaced-apart lamps for oscillation on upright axes, a link connecting the lamps for movement in unison on such upright axes, a link pivotally connected to the first-mentioned link near one of said lamps and extending across to a position adjacent the other lamp, a yoke pivotally mounted for oscillation on an upright axis near the last-named lamp and pivotally connected to said second-mentioned link, and an additional link pivotally connected to the other end of said yoke and adapted to extend across to the other side of the vehicle for connection to steering mechanism.

11. A vehicle lamp mounting comprising two spaced-apart supports; a horizontal shaft journaled in said supports; bearing members fixed on the shaft; an arm on one of the bearing members; a housing pivoted on said arm; a rack bar pivoted to one of said supports and extending through said housing; a resilient pawl in said housing engaging said rack bar; means for alternately engaging and disengaging the pawl from the rack bar automatically; a spring connected with said arm for moving the latter in one direction; and manually operable means for moving the arm in the other direction.

12. A vehicle lamp mounting comprising spaced supports; a horizontal shaft journaled in said supports; bearing members secured on said shaft; an arm on one of the bearing members; a housing pivoted on the arm; a rack bar pivoted to one of the supports and extending through said housing; stops at the ends of said rack bar; a resilient pawl in said housing; a setting member extending through said housing and adapted to engage said stops, one at a time, to alternately engage and disengage the pawl with the rack bar; a spring adapted to move said arm in one direction; a manually operable means for moving said arm in the other direction; lamp brackets mounted on vertical axes in said bearing members; a connection between said lamp brackets; and a steering gear operatively connected with said lamp brackets.

In testimony whereof I have signed my name to this specification on this 7th day of February, 1920.

CHARLES H. WOLFE.